United States Patent
Ayres et al.

(10) Patent No.: US 9,626,236 B2
(45) Date of Patent: *Apr. 18, 2017

(54) METHOD, APPARATUS AND COMPUTER PROGRAM FOR ADMINISTERING MESSAGES WHICH A CONSUMING APPLICATION FAILS TO PROCESS

(71) Applicant: International Business Machines Corporation, Armonk, NY (US)

(72) Inventors: Malcolm D. Ayres, Romsey (GB); Andrew I. Hickson, Hants (GB); Andrew M. Leonard, Hampshire (GB); David Ware, Wiltshire (GB); Andrew J. Whitfield, Southampton (GB)

(73) Assignee: nternational Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/831,833

(22) Filed: Aug. 20, 2015

(65) Prior Publication Data

US 2015/0355956 A1    Dec. 10, 2015

Related U.S. Application Data

(63) Continuation of application No. 12/049,908, filed on Mar. 17, 2008, now Pat. No. 9,146,788.

(30) Foreign Application Priority Data

Mar. 16, 2007    (EP) .................................... 07104343

(51) Int. Cl.
*G06F 9/54* (2006.01)

(52) U.S. Cl.
CPC .................................. *G06F 9/546* (2013.01)

(58) Field of Classification Search
None
See application file for complete search history.

(56) References Cited

U.S. PATENT DOCUMENTS

| 5,878,056 A * | 3/1999 | Black .................... H04L 1/1835 370/249 |
| 9,146,788 B2 * | 9/2015 | Ayres ...................... G06F 9/546 |
| 2004/0068479 A1 * | 4/2004 | Wolfson ............ G06F 17/30578 |

OTHER PUBLICATIONS

Dixon et al.; "United States Patent Trial and Appeal Board Decision—Appeal No. 2013-000089"; Apr. 29, 2015.*
Paul Titheridge; "How WebSphere Application Server handles poison messages"; May 26, 2004.

* cited by examiner

*Primary Examiner* — Umut Onat
(74) *Attorney, Agent, or Firm* — Steven M. Greenberg, Esq.; CRGO LAW

(57) ABSTRACT

Disclosed is a method for administering messages. In response to a determination that one or more consuming applications have failed to process the same message on a queue a predetermined number of times, the message is made unavailable to consuming applications. Responsive to determining that a predetermined number of messages have been made unavailable to consuming applications, one or more consuming applications are prevented from consuming messages from the queue.

30 Claims, 8 Drawing Sheets

METHOD, APPARATUS AND COMPUTER PROGRAM FOR ADMINISTERING MESSAGES WHICH A CONSUMING APPLICATION FAILS TO PROCESS

This application is a Continuation of U.S. application Ser. No. 12/049,908, filed Mar. 17, 2008, now U.S. Pat. No. 9,146,788, which claims priority to European Patent Application 07104343.4, filed Mar. 16, 2007, the entirety of which are incorporated herein by reference.

FIELD OF THE INVENTION

The invention relates to the field of messaging and more particularly to the failure by a consuming application to process one or more messages.

BACKGROUND OF THE INVENTION

Asynchronous transfer of messages between application programs running on different data processing systems within a network is well known in the art, and is implemented by a number of commercially available messaging systems. A sender application program issues a command to send (put) a message to a target queue, and a queue manager program handles the complexities of transferring the message from the sender to the target queue, which may be remotely located across a heterogeneous computer network. The target queue is a local input queue for another application program, which retrieves (gets) the message from this input queue asynchronously from the send operation. The receiver application program then performs its processing on the message, and may generate further messages.

Thus the receiver application program services requests which are instigated by the messages that it retrieves and consumes (typically under a transaction). Such an application will however occasionally be unable to process a request/message successfully. Generally such applications are transacted, i.e. they consume each request message inside a transaction and on successful completion of the request the transaction is committed. When the transaction commits the message is removed from the queue. However, if the consuming application fails to process the request the transaction may be rolled back. Rolling back a transaction will make the message re-available on the queue, generally at the head of the queue (if the queue works in a FIFO way) resulting in the consuming application being given the same message when they ask for the next message on the queue. If the application is still unable to process the request another roll back will occur and the whole process repeats.

Messaging systems provide the ability to break out of this eternal loop in one of two manners:

a) Provision of a 'dead letter queue' (DLQ) or 'exception destination' and the detection by the messaging system of a message being re-delivered repeatedly. Once the consumption of a message has been rolled back a certain number of times (past a defined threshold) the messaging system will automatically move the message to the dead letter queue or exception destination so that it is no longer seen by the consuming application. The consuming application will now be able to process the next message in the queue. Messages on the DLQ can be the subject of administrator attention.

b) Rather than moving a problem message to another queue in the event of that message being rolled back past a certain threshold, the consuming application is stopped. The consuming application may be managed by an application server, in which case the application server is able to stop the consuming application. At this point the administrator must step in to restart the application once the problem has been resolved.

These two solutions address two different situations.

Situation 1

A so called 'poison' message is introduced, for instance a badly formed message that the consuming application will never be able to process successfully. Solution (a) solves this by automatically moving such a message off to the side as soon as possible so that subsequent messages in the queue can be processed. However, solution (b) will immediately stop the application on this poison message. This is not so ideal, since the problem does not lie with the application and therefore prevents timely processing of further, correctly formed messages. The administrator is forced to intervene to remove the offending message and restart the application to process any subsequent messages.

Situation 2

The consuming application experiences a transitory problem that prevents it from processing any messages for an unknown period, for instance its backend database connection goes down for ten minutes. In this situation solution (a) can cause the entire queue of messages to be transferred to the dead letter queue as fast as they arrive before the administrator notices and stops the application by hand, fixes the problem and moves all the messages back from the dead letter queue onto the original queue to be consumed. Solution (b) however, stops the application on the first message and waits for the administrator to intervene, hopefully after they've re-established the database connection, requiring no messages to be moved from one queue to another and back again.

Unfortunately neither of these solutions satisfactorily protects a system from both of these potential problem situations.

SUMMARY OF THE INVENTION

According to a first aspect, there is provided a method for administering messages, the method comprising: in response to determining that one or more consuming applications have failed to process the same message on a queue a predetermined number of times, making that message unavailable to consuming applications; and responsive to determining that a predetermined number of messages have been made unavailable to consuming applications, preventing one or more consuming applications from consuming messages from the queue.

A consuming application may be prevented by actually stopping the application. In another embodiment, the whole queue is disabled. In yet another embodiment, access for a particular application is blocked.

In one embodiment the predetermined number of times may be one. In other embodiments a higher threshold may be set.

According to a preferred embodiment, a request is received from a consuming application to process a message. This results in the next appropriate message being locked to the requesting consumer. This may be the very next message in the queue or may be the next message that the consumer is interested in—e.g. if the consuming application is consuming messages using a filter or selector.

Preferably an indication is received as to whether the requesting consuming application has successfully processed the message. This may come directly from the consuming application itself. Alternatively this indication may come from a transaction co-ordinator responsible for co-ordinating a transaction associated with the message.

In accordance with a preferred embodiment, responsive to determining that the requesting consuming application has failed to process the message successfully, the message is made re-available to consuming applications and a retry count for the message is adjusted. In the described embodiment, such an adjustment involves incrementing the retry count, however no limitation is intended.

The retry count may be used to determine that one or more consuming applications have failed to process the same message a predetermined number of times.

In one embodiment it may be determined that a predetermined number of consecutively consumed messages have been made unavailable to consuming applications before one or more consuming applications are prevented from consuming messages from the queue. In another embodiment, it may be determined that a predetermined number of messages within a set of messages have been made unavailable to consuming applications—e.g. 7 out of 10 messages.

In one embodiment, messages are made unavailable by moving such messages to a side queue. Once on the side queue, such messages may then enjoy administrative attention.

In another embodiment, messages are not moved to a side queue straightaway. Such messages are left on the queue but are made invisible to consuming applications.

Once any problem associated with consuming applications has been rectified then previously prevented consuming applications may be permitted to consume messages again. If a problematic consuming application has actually been stopped, then the fact that the application is back online again and has successfully consumed a message is preferably used to indicate that the problem has been rectified. This is not however the case for the embodiment in which access to the queue is blocked for the particular application, or where access to the whole queue is disabled for all applications. Instead, the act of turning the application back on is an administrative action which could be detected by a monitoring application.

Before such consumption is enabled, any invisible messages are preferably made visible again to consuming applications. If a consuming application fails to process a message which has been made visible again a certain number of additional times (e.g. 5), the message is then moved off to a side queue.

In one embodiment one or more consuming applications are prevented from consuming messages from the queue by stopping such consuming applications.

In another embodiment, access to the queue for the one or more consuming applications is blocked.

In another embodiment, only those consuming applications interested in consuming a particular type of message from the queue are prevented. This is useful if consuming applications access a different backend resource on the basis of the type of messages that they are consuming. One backend resource may be experiencing a transitory problem which is not affecting other backend resources.

In another embodiment, one or more consuming application which is responsible for messages being made unavailable is identified. Such specific consuming applications are then prevented from consuming messages from the queue. This is useful where a particular application is experiencing an internal error.

According to a second aspect, there is provided an apparatus for administering messages, the apparatus comprising: means, responsive to a determination that one or more consuming applications have failed to process the same message on a queue a predetermined number of times, for making that message unavailable to consuming applications; and means, responsive to determining that a predetermined number of messages have been made unavailable to consuming applications, for preventing one or more consuming applications from consuming messages from the queue.

According to a third aspect, there is provided a computer program for administering messages, the computer program comprising program code means adapted to perform the following method when said program is run on a computer: in response to determining that one or more consuming applications have failed to process the same message on a queue a predetermined number of times, making that message unavailable to consuming applications; and responsive to determining that a predetermined number of messages have been made unavailable to consuming applications, preventing one or more consuming applications from consuming messages from the queue.

BRIEF DESCRIPTION OF THE DRAWINGS

A preferred embodiment of the present invention will now be described, by way of example only, and with reference to the following drawings.

DETAILED DESCRIPTION

Figure 1:
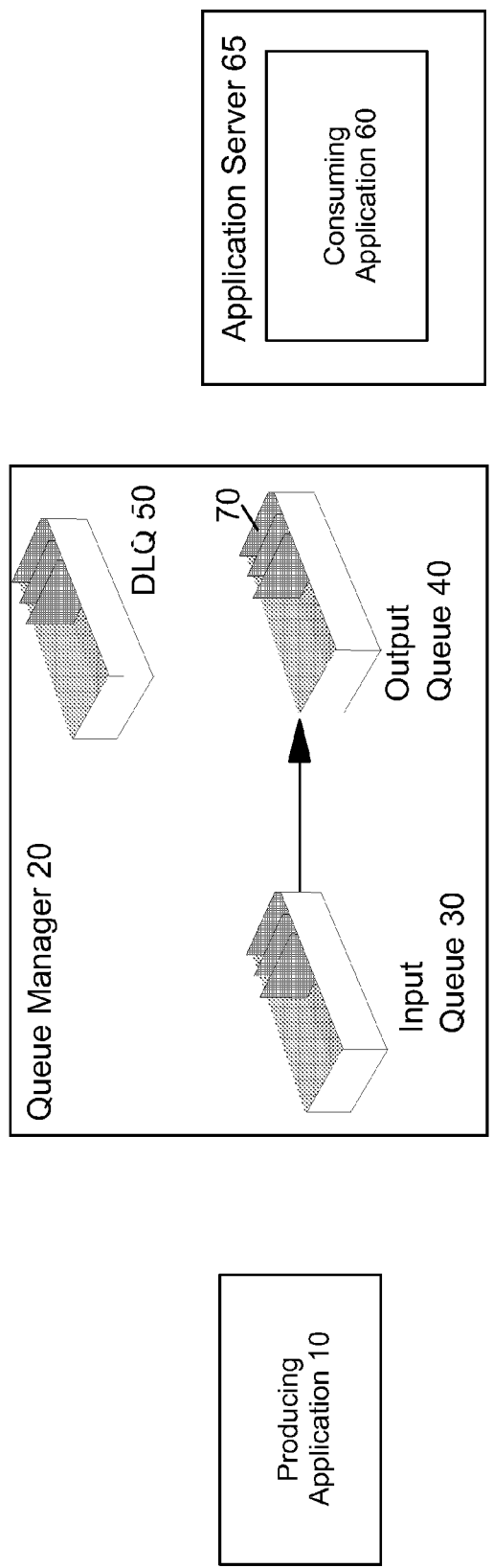
FIG. 1 illustrates a messaging system in which a preferred embodiment of the present invention may be implemented.
Figure 2A:
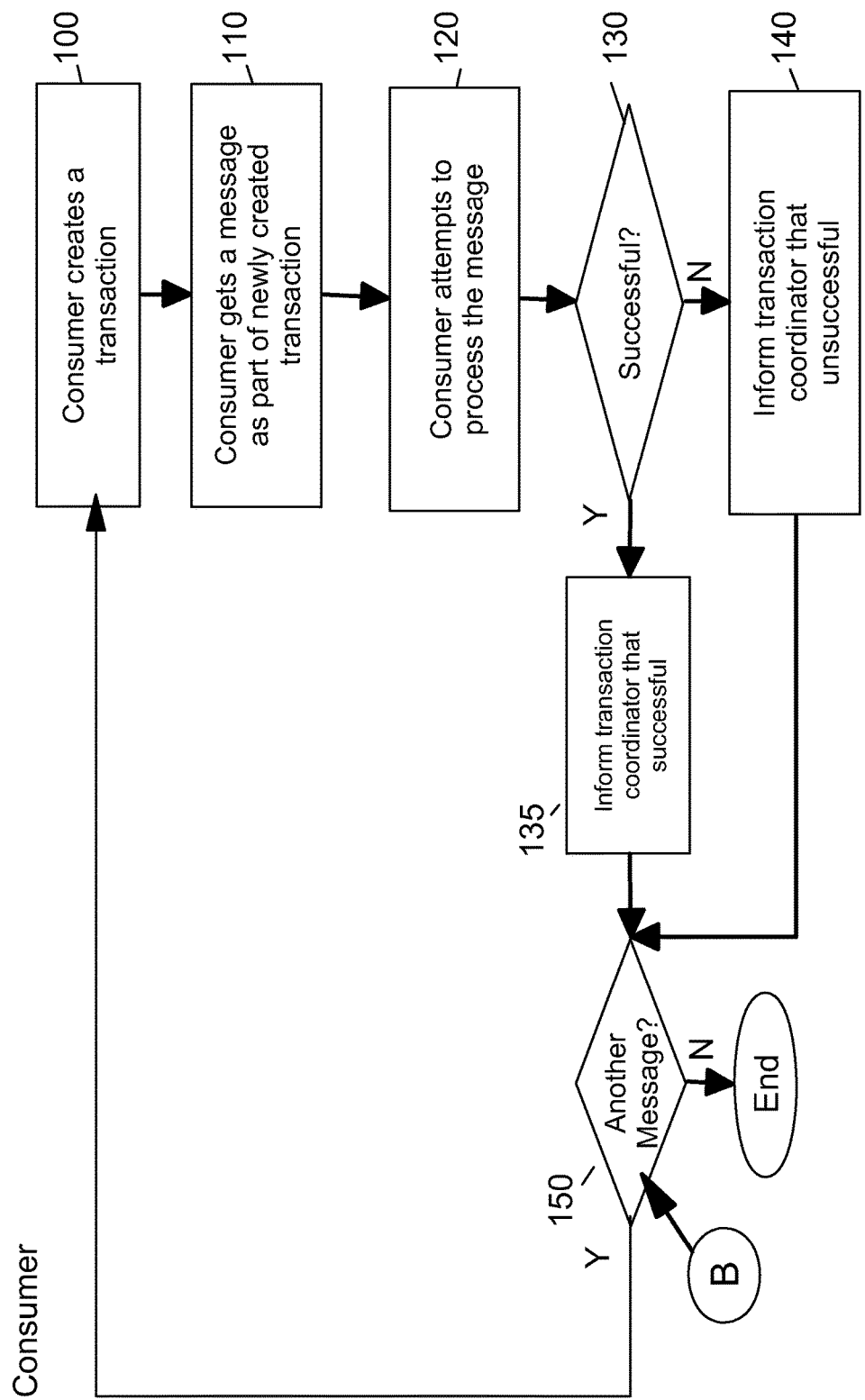
FIGS. 2a, 2b and 2c illustrate the processing of the present invention in accordance with a preferred embodiment.
Figure 2B:
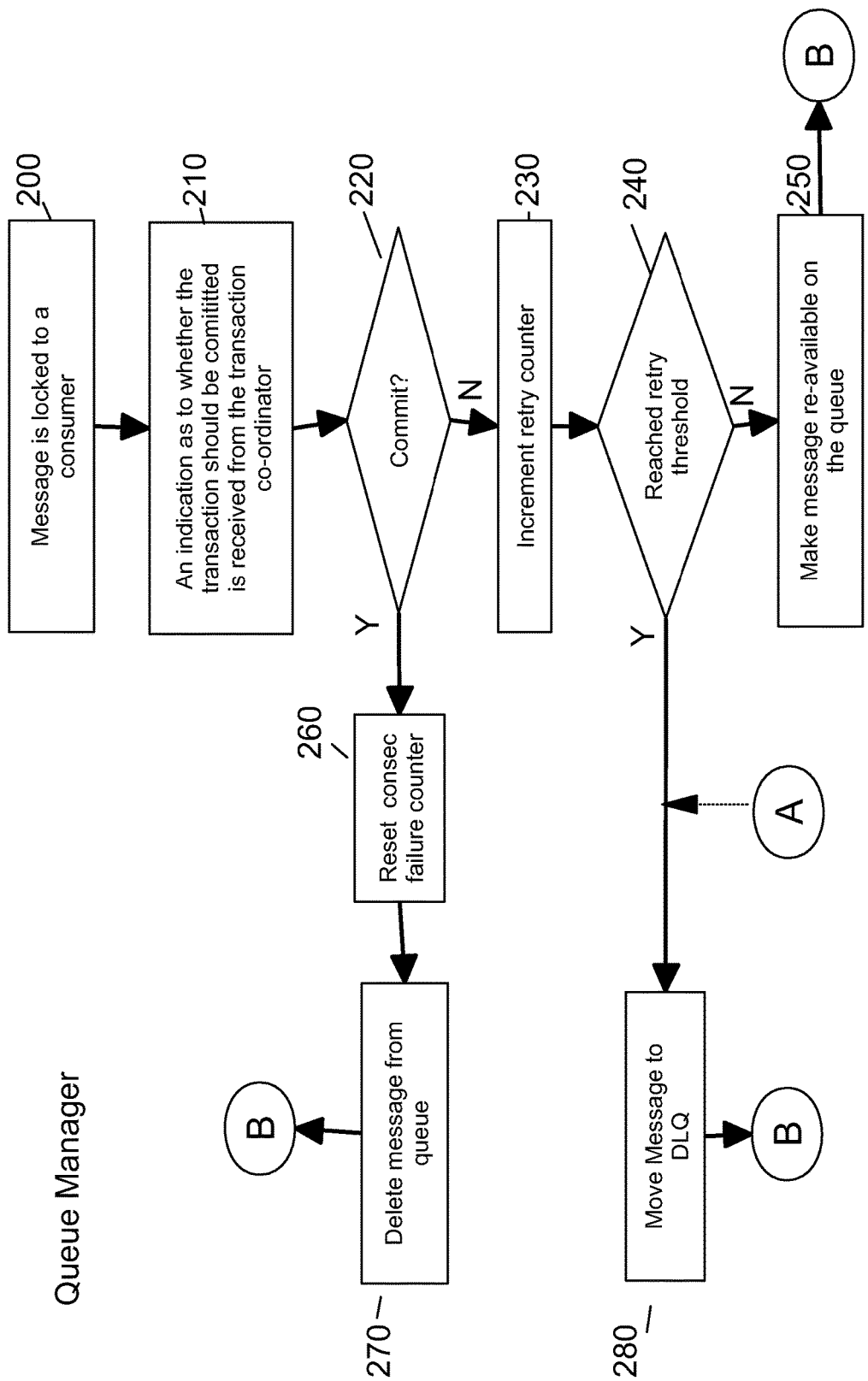
Figure 2C:
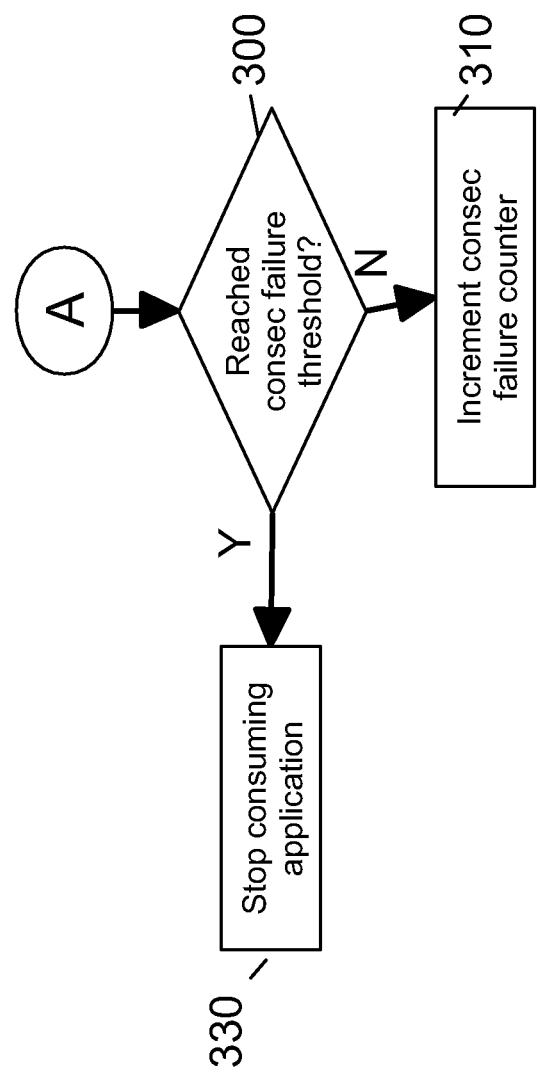
Figure 3:
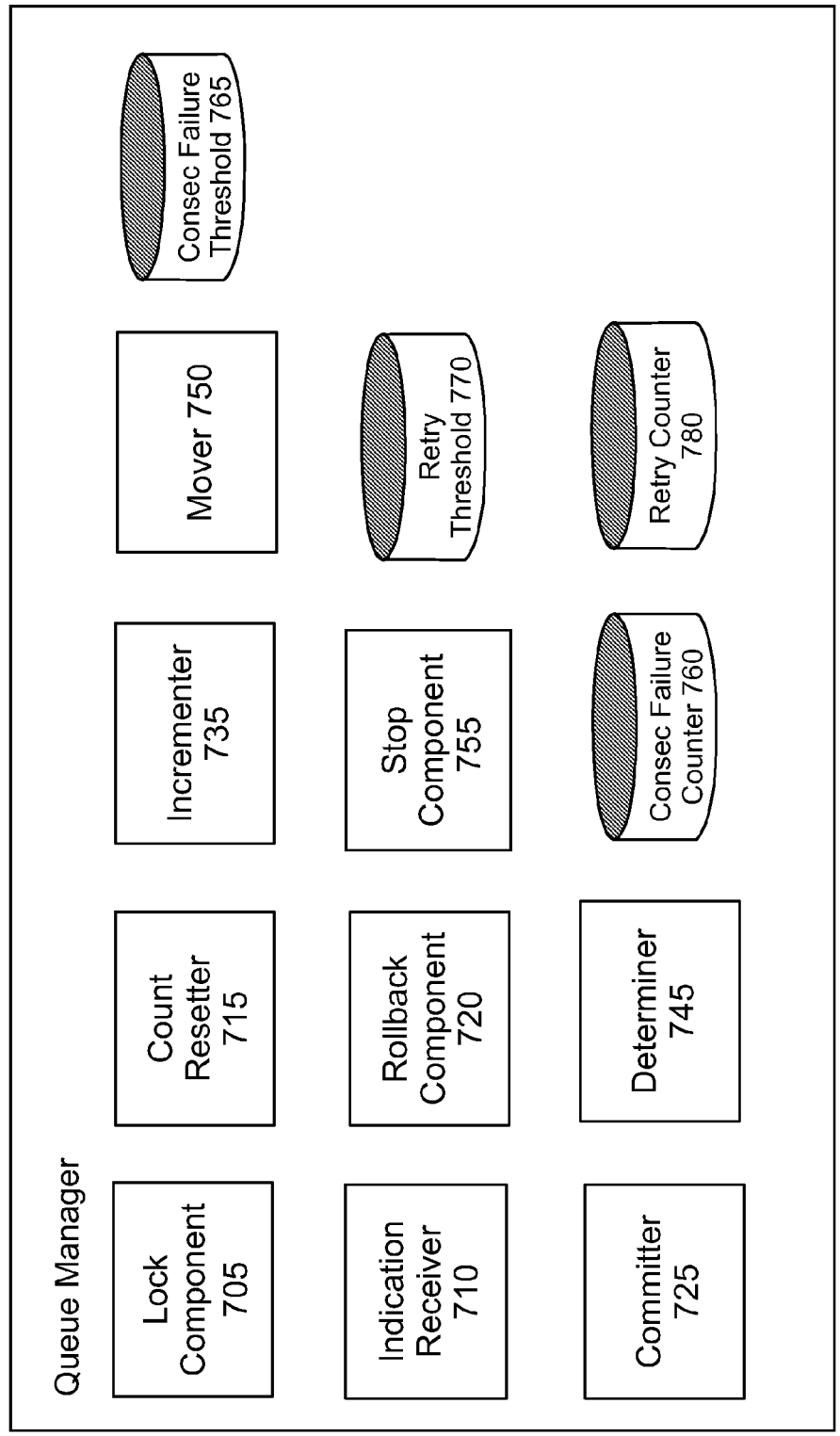
FIG. 3 provides additional exemplary detail with respect to the componentry of FIG. 1's queue manager.

FIG. 1 illustrates an exemplary messaging system in which a preferred embodiment of the present invention may be implemented. FIGS. 2a, 2b and 2c illustrate the processing of a preferred embodiment of the present invention. FIG. 3 provides a more detailed view of the componentry hosted by the queue manager of FIG. 1 in accordance with a preferred embodiment of the present invention. The figures should be read in conjunction with one another.

With reference to FIG. 1, a producing application 10 puts messages to an input queue 30 which is hosted by queue manager 20. Such messages are transferred from input queue 30 to output queue 40. Consuming application (consumer) 60, which may be managed by application server 65, then retrieves messages from queue 40 and processes them. (Note, the application server is an optional element.) The invention is particularly concerned with messages on the output queue that consuming application 60 finds itself unable to process. Such messages may eventually find their way onto dead letter queue (DLQ) 50. The preferred processing and use of the DLQ will be described in more detail below.

As illustrated in FIG. 2a, consumer 60 wishes to retrieve message 70 and so creates a transaction at step 100. The consumer gets the message as part of the newly created transaction at step 110. Overall co-ordination of the transaction is performed by a transaction co-ordinator (not shown).

Queue manager 20 then locks message 70 to consumer 60 at step 200 (as shown in FIG. 2b) (lock component 705).

This may, for example, involve leaving the message on the queue but making it invisible to other consumers.

The consumer is now able to attempt to process the message at step 120. Such processing may, for example, involve accessing a backend resource such as a database (not shown).

At step 130, it is determined whether the consumer has been successful in its processing of message 70. If the answer is yes (step 135), then the consumer informs the transaction co-ordinator which in turn instructs the queue manager to commit the message.

At step 135 the transaction co-ordinator can be notified of the successful processing of the message and, the consumer may then attempt to retrieve another message and the process repeats (steps 150, 100).

In the alternative, the consumer may not have been able to process message 70 successfully. For example, the backend database may be experiencing a transitory problem which prevents the consumer from using the message to update the database.

The consumer informs the transaction co-ordinator at step 140 that processing has been unsuccessful. The transaction co-ordinator in turn instructs the queue manager to rollback the transaction.

(Note, the discovery of a failure may be made by a backend resource rather than the consuming application.)

Thus irrespective of whether the consumer is able to process the message, according to the preferred embodiment the queue manager receives an indication (indication receiver 710) from the transaction co-ordinator as to whether the transaction should be committed or rolled back at step 210 of FIG. 2b.

If it is determined (determiner 745) at step 220 that the transaction is to be committed, then a consecutive failure (consec failure) counter 760 is reset at step 260 by count resetter 715. The consecutive failure counter is maintained to keep track of the number of consecutively consumed messages that have been placed on dead letter queue (DLQ) 50, and will be explained in more detail later. A message is preferably placed on the DLQ after it has been rolled back a certain number of times.

After the counter has been reset, at step 270 the message is deleted (committer 725) from the output queue 40 and the consumer can retrieve another message (if one exists) at step 150. Thus the process repeats itself.

Alternatively, it may be determined (determiner 745) at step 220 that the transaction should be rolled back. If this is the case, then the retry counter (which maintains a retry count) is incremented (incrementer 735; step 230) It is then determined at step 240 whether a retry threshold 770 has been reached (determiner 745). Such a determination is made using a retry counter 780. Again this will be discussed in more detail later. Briefly however, the retry counter keeps a count of the number of times the consumption of a message, performed under a transaction, has had to be rolled back. For example, if consumption of the same message has been rolled back five times already, this may be indicative of a problematic message. Whilst the consecutive failure counter is maintained across the whole output queue, a retry counter is maintained for each individual message. It is preferably a property of the message header.

If the retry threshold has not yet been met, the message is made re-available on queue 40 at step 250 (rollback component 720). This may involve unlocking the message such that it is no longer invisible to other consumers. The process then repeats itself.

If on the other hand the retry threshold 770 has been reached for a message, then previously the message would have been moved straight to the DLQ. As indicated above, the problem with this approach is that it does not cater for the situation where the problem lies not with the message itself but with the application attempting to process the message. This approach would result in all messages being moved to the DLQ, despite the messages themselves being valid.

Thus some additional processing is added in between steps 230 and 280. Such additional processing is illustrated in FIG. 2c.

At step 300 it is determined (determiner 745) whether a consecutive failure threshold 765 has been reached using the consec failure counter 760. The consecutive failure threshold indicates the maximum allowable number of consecutively consumed messages that can be placed on the dead letter queue. If the threshold has not been reached, then the consecutive failure counter is adjusted. In the embodiment described the counter is incremented (incrementer 735) at step 310 and the message is moved (mover 750) to DLQ 50 at step 280. The process then repeats.

On the other hand, if the consecutive failure threshold 765 has been reached this may be indicative of a problem with the application itself. Thus the consuming application is stopped (stop component 755) at step 330 and any problem can receive administrative attention before the application is restarted.

Thus a mechanism is provided which is lenient enough to permit the occasional 'poison' message to be re-routed off to a side queue (DLQ) when it arrives but to prevent an entire stream of messages from being routed to the side queue in the event of a transient application problem occurring. This reduces the spontaneous intervention required by the administrator in such situations.

This solution preferably allows an administrator to configure the level of 'lenience' that they wish to give to failing messages:

(i) zero: never move a message to the side queue, just stop the consuming application—i.e. original solution (b); or (ii) defined values (1, 2, 3, 4, . . . ): Allow a number of bad message to be moved off to the side but if the problem persists, stop the consuming application before all messages are diverted; or (iii) unlimited: always move problem messages to the side queue—i.e. original solution (a)

Additional refinements of the solution discussed above are also possible:

The 'consecutive' nature of failures (i.e. those messages moved to a side queue) may be relaxed to a proportion of failed messages to successful messages, e.g. "Stop the consuming application if seven out of ten consecutively consumed messages fail".

Figure 4A:
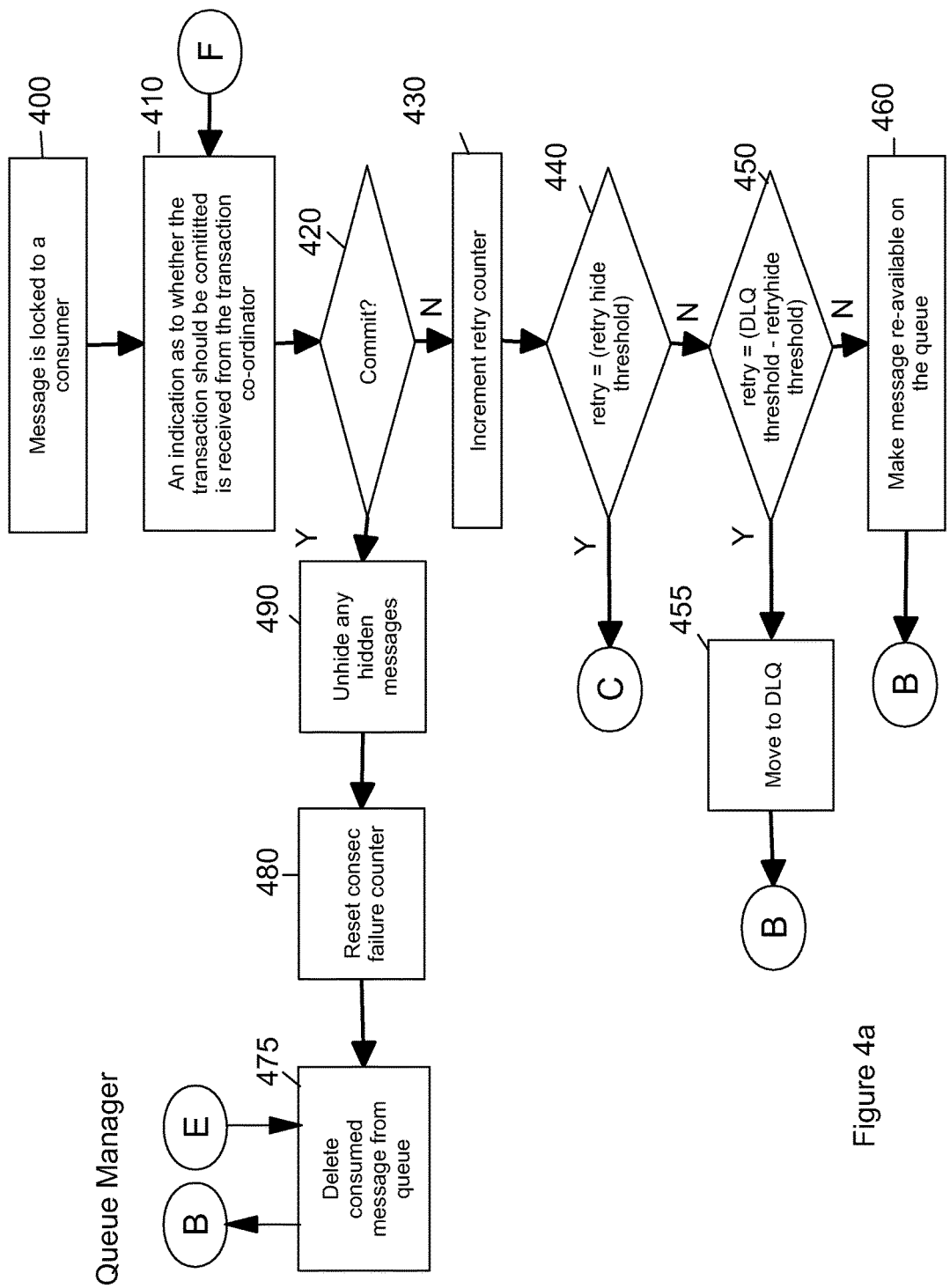
FIGS. 4a, 4b and FIG. 5 illustrate the processing and componentry of an optional enhancement of the present invention.

A further enhancement involves temporarily refraining from sending any failing messages to the side queue until it has been determined whether the failure is particular to certain messages or probably across all messages (i.e. application specific). This will be described in more detail with reference mainly to FIGS. 4a, 4b and 5.

When a consuming application retrieves a message, the message is locked to the consumer at step 400 (lock component 805). An indication is subsequently received (indication receiver 810) from the transaction co-ordinator as to whether the transaction containing the retrieved message should be committed (step 410). It is therefore determined (determiner 845) whether to commit the message (step 420). If the message can be committed, then any hidden messages are unhidden at step 490 (visibility component 840). The circumstance under which messages become hidden will be discussed in more detail later. The consecutive failure counter 860 is then reset at step 480 (count resetter 815) and the consumed message can be deleted from the output queue at step 475 (committer 825). The process then repeats itself with Previously Presented messages.

If on the other hand a message is not to be committed, the retry counter for the message is incremented (incrementer 735; step 430). It is then determined (determiner 845) whether a retryhide threshold has been reached at step 440. As before a retry counter 880 is maintained for each message to keep track of the number of times a message has been rolled back. The retryhide threshold is the maximum number of times that the consumption of the same message is allowed to be rolled back before the message is hidden on the output queue.

Figure 4B:
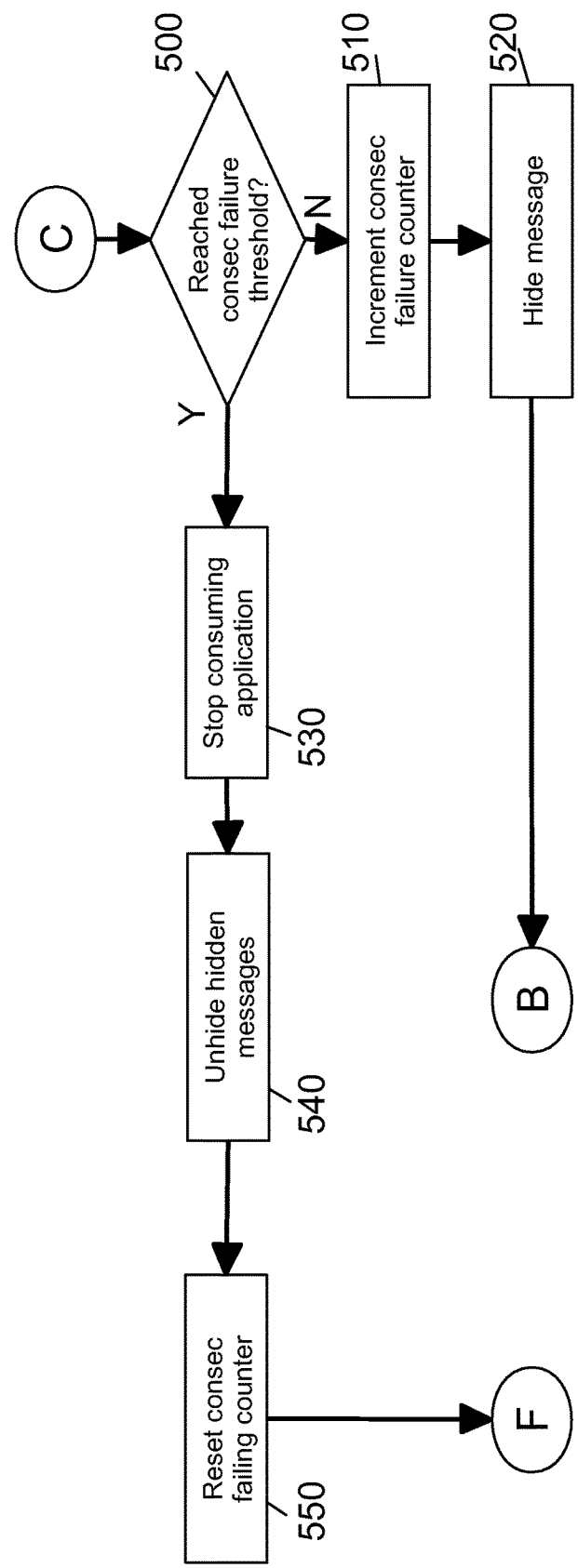
Figure 5:
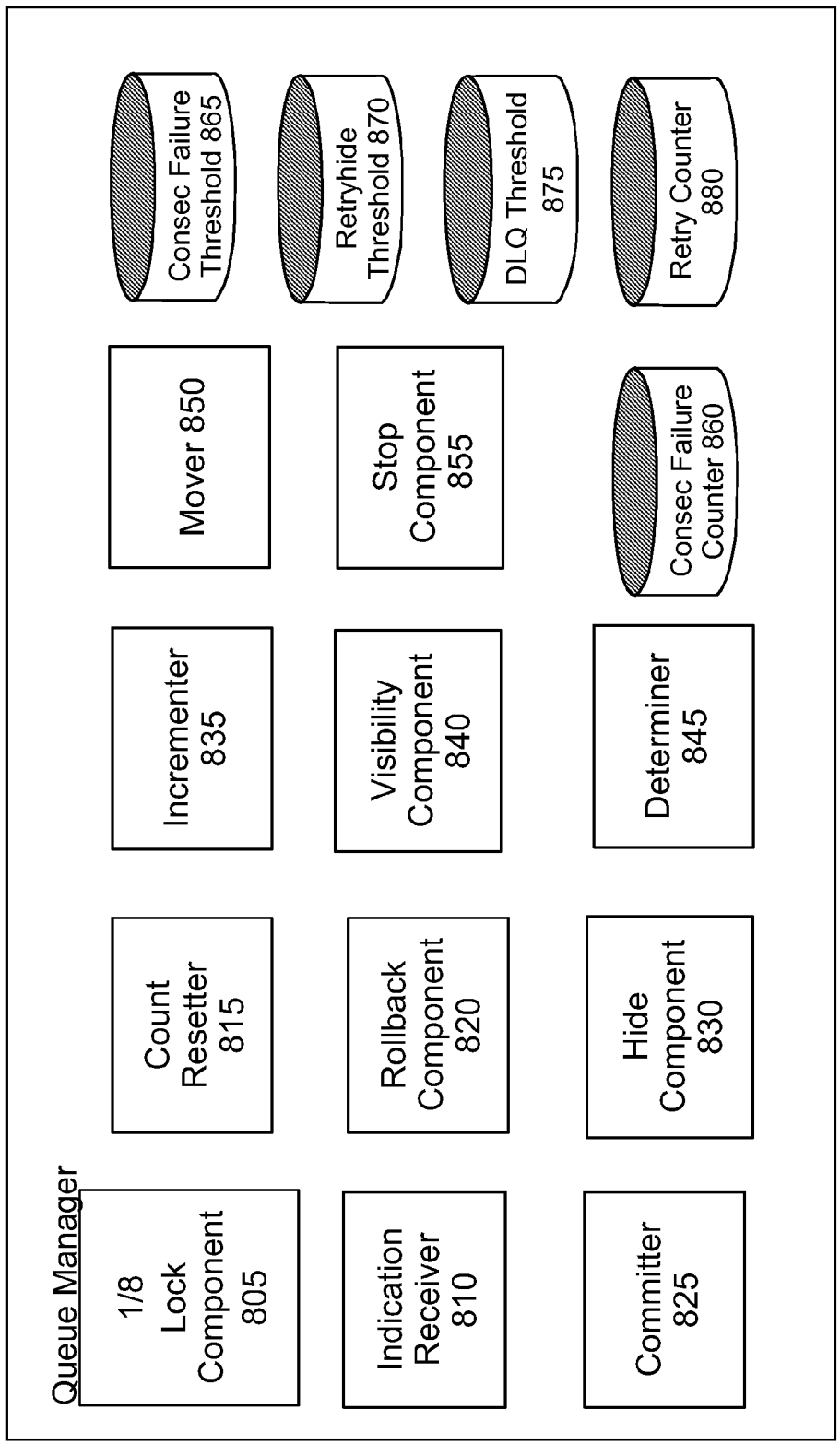

If the retryhide threshold has been reached, processing proceeds to FIG. 4b. It is determined (determiner 845) whether the consecutive failure threshold 865 has been reached at step 500. If it hasn't, then the consecutive failure counter is incremented (incrementer 835; step 510) and the message in question is hidden (hide component 830) at step 520. This means that the message remains on the output queue but is invisible to all applications consuming from the queue. Having hidden the message the process may repeat itself.

If in the alternative the consecutive failure threshold 865 has been reached (in other words, the maximum number of messages that are allowed to fail in succession has been reached), it is determined that this is likely to be as a result of a problem with the consuming application. Consequently the consuming application is stopped (stop component 855) at step 530 so that it can be the subject of administrative attention. Meantime, any hidden messages on output queue 40 are unhidden (visibility component 840) in preparation for the restart of the application (step 540). The consecutive failure counter is reset at step 550.

Once the problem with the application has been fixed, it can be restarted.—Processing then proceeds to step 410 of FIG. 4a.

The application then starts retrieving messages as before. For each message, an indication is received (indication receiver 810) at the queue manager as to whether a transaction containing the message can be committed (step 410). If a commit is possible (step 420), then processing continues at step 460 as previously described.

On the other hand, if the message is not to be committed, then the retry counter for the message is incremented (step 430; incrementer 735) and then it is determined (determiner 845) at step 440 whether the retryhide has been reached for the message. The answer on this loop for a previously hidden message will be no, since the retry count will exceed this threshold.

A second threshold is also maintained, the DLQ threshold 875. The DLQ threshold 875 is the maximum number of times the consumption of same message is allowed to be rolled back (rollback component 820) before the message is moved to the dead letter queue (mover 850). This threshold is used in conjunction with the retryhide threshold to determine the number of additional times a previously hidden message is allowed to be rolled back before it is moved to the dead letter queue.

Thus if the DLQ threshold—retryhide threshold has been reached at step 450 the message will be moved (mover 850) to the dead letter queue at step 455. The process may then repeat itself for additional messages. Thus if the DLQ threshold is 15 and the retryhide threshold is 10, then the message is tried a further 5 times once it has been made visible again before it is moved off to a side queue.

If in the alternative, the DLQ threshold 875—retryhide threshold 870 has not yet been reached (i.e. for messages that have not previously been hidden), then the message is made re-available on the queue and processing repeats itself.

Thus a further mechanism has been described which involves temporarily refraining from sending any failing messages to the side queue until it has been determined whether the failure is particular to certain messages or more probably across all messages (i.e. application specific). This is particularly advantageous because once a message is on the side queue, administrative attention is required to get the message back into the output queue. This is particularly pertinent when the message itself isn't the cause of the problem.

The behaviour described saves having to move the first few failing messages to the side queue in the event that the problem is application specific, but also maintains the ability to move messages off to the side queue in the event that it is the messages themselves that are at fault.

This obviously introduces reordering of messages but the existence of the side queue has already introduced that possibility and so this is deemed acceptable behaviour.

With regard to the solution as described as a whole, it should be noted that typically consumers will be performing the same kind of task on all the messages on output queue 40. In other words, all consumers are likely to be using the same backend resources etc. to complete the processing of each message they retrieve. This means that if a backend resource is experiencing some kind of problem, the problem will manifest itself across all consumers.

In certain circumstances however consumers may be consuming from the queue using selectors. For example, consumer A may desire messages of type 1, whilst consumer B is after messages of type 2. In such a scenario it is possible that consumer A may be interacting with a different backend resource to that being used by consumer B. If this is the case, then any solution would have to keep a counter for the number of consecutively failing messages of type 1 but also a separate counter for the number of consecutively failing messages of type 2. In other words all consuming applications which are consuming the same type of message will share their own consecutive failure counter. Thus when it is deemed necessary to stop consuming applications, it may be necessary to stop only a certain type of consuming application—e.g. those consuming messages of type one only.

In another embodiment, applications which fail to consume messages are kept track of and when it is deemed necessary to stop a consuming application, these are the ones that are stopped. Consuming applications which fail to process a certain proportion of messages may be the ones that are stopped. Such consuming applications may fail to process a certain proportion of messages because one of them is experiencing, for example, an internal error. In this embodiment, each consuming application has its own consecutive failure counter.

It should also be appreciated that whilst the invention has been described in terms of transactional message retrieval, the invention is not limited to such. In other words, the invention is also applicable to non-transactional message retrieval. For example, the Java™ Message Service (JMS) 1.1 specification discusses non-transacted message acknowledgement options. These, in conjunction with a JMS MessageListener, make it possible for messages to be consumed outside of a transaction but still put back on the queue if the application fails for some reason. (Java and all Java-based trademarks and logos are trademarks of Sun Microsystems, Inc. in the United States, other countries, or both.)

It should further be appreciated that whilst the embodiment has been described in terms of a problem with a backend resource with which the consumer is interacting, the problem may instead lie with the consumer itself. The consumer will be able to retrieve messages but may be unable to process them due to an internal fault.

In terms of stopping a consumer, or group of consumers, it may be possible for the queue manager to request such a stoppage—for example, if the application is running in a managed environment such as an application server or monitoring system, via notification to that system. Alternatively, the queue manager may be able to block access to a particular consumer, or group of consumers,—i.e. to prevent those consumers from consuming messages from the queue. Another option is to disable the whole queue such that no messages may be consumed. This is useful in the situation where it is no This solution does not however work well in the situation where a particular application is at fault as opposed to all application which are consuming from the queue.

It should be appreciated that the embodiments described herein mention incrementing various counters. This is by way example only and no limitation is intended. For example, a counter could be decremented instead.

The invention claimed is:

1. A computer program product for administering messages, the computer program product comprising:
   a non-transitory computer readable storage medium having computer readable program code embodied therewith, the computer readable program code comprising:
   computer readable program code for, in response to a determination that one or more consuming applications have failed to process a same message on a queue a predetermined number of times, making the same message unavailable to the one or more consuming applications; and
   computer readable program code for, responsive to determining that a predetermined number of messages have been made unavailable to the one or more consuming applications, preventing the one or more consuming applications from consuming messages from the queue.

2. The computer program product of claim 1, further comprising:
   computer readable program code for receiving a request to process a message from a requesting consuming application; and
   computer readable program code for locking a next appropriate message to the requesting consuming application.

3. The computer program product of claim 2, further comprising:
   computer readable program code for receiving an indication as to whether or not the message has been successfully processed by the requesting consuming application.

4. The computer program product of claim 2, further comprising:
   computer readable program code for responsive to determining that the requesting consuming application has failed to process the message successfully, making the message re-available to others of the one or more consuming applications; and
   computer readable program code for adjusting a retry count for the message.

5. The computer program product of claim 4, further comprising:
   computer readable program code for using the retry count to determine that the one or more consuming applications have failed to process the same message a different predetermined number of times.

6. The computer program product of claim 1, wherein the computer readable program code for determining that the predetermined number of messages have been made unavailable to the one or more consuming applications, comprises:
   computer readable program code for determining that a predetermined number of consecutively consumed messages have been made unavailable to the one or more consuming applications.

7. The computer program product of claim 1, wherein the computer readable program code for determining that the predetermined number of messages have been made unavailable to the consuming applications, comprises:
   computer readable program code for determining that a predetermined number of messages within a set of messages have been made unavailable to the consuming applications.

8. The computer program product of claim 1, wherein the computer readable program code for making the message unavailable to the consuming applications, comprises:
   computer readable program code for moving each message to a side queue.

9. The computer program product of claim 1, wherein the computer readable program code for making the message unavailable to consuming the applications, comprises:
   computer readable program code for leaving the message on the queue but making it invisible to the consuming applications.

10. The computer program product of claim 9, further comprising:
    computer readable program code for making invisible messages visible again to the consuming applications;
    computer readable program code for permitting a previously prevented consuming application to consume messages;
    computer readable program code for permitting a number of additional attempts by one or more of the consuming applications at processing previously invisible messages before moving the previously invisible messages to a side queue.

11. The computer program product of claim 1, wherein the computer readable program code for preventing one or more of the consuming applications from consuming messages from the queue, comprises:
    computer readable program code for stopping the one or more consuming applications.

12. The computer program product of claim 1, wherein the computer readable program code for preventing the one or more consuming applications from consuming messages from the queue, comprises:
    computer readable program code for blocking access by the one or more consuming applications to the queue.

13. The computer program product of claim 1, wherein the computer readable program code for preventing the one or more consuming applications from consuming messages from the queue, comprises:
    computer readable program code for preventing those of the one or more consuming applications interested in consuming messages of a particular type.

14. The computer program product of claim 1, wherein the computer readable program code for preventing the one or more consuming applications from consuming messages from the queue, comprises:

computer readable program code for identifying amongst the one or more consuming applications a consuming application responsible for messages being made unavailable; and computer readable program code for preventing the identified consuming application from consuming messages from the queue.

15. The computer program product of claim 1, wherein the computer readable program code for preventing the one or more consuming applications from consuming messages from the queue, comprises:

computer readable program code for disabling the queue.

16. A system for administering messages, the system comprising:

a computer with memory and at least one processor;

a queue manager executing in the memory of the computer, the queue manager comprising program code that when executed in the memory of the computer causes the computer to:

in response to a determination that one or more consuming applications have failed to process a same message on a queue a predetermined number of times, make the same message unavailable to the one or more consuming applications; and responsive to determining that a predetermined number of messages have been made unavailable to the one or more consuming applications, prevent the one or more consuming applications from consuming messages from the queue.

17. The system of claim 16, wherein the queue manager further comprises program code to receive a request to process a message from a requesting consuming application and to lock locking a next appropriate message to the requesting consuming application.

18. The system of claim 16, wherein the queue manager further comprises program code to receive an indication as to whether or not the message has been successfully processed by the requesting consuming application.

19. The system of claim 16, wherein the queue manager further comprises program code to, responsive to determining that the requesting consuming application has failed to process the message successfully, make the message re-available to others of the one or more consuming applications, and to adjust a retry count for the message.

20. The system of claim 16, wherein the queue manager further comprises program code to use the retry count to determine that the one or more consuming applications have failed to process the same message a different predetermined number of times.

21. The system of claim 16, wherein the program code to determine that the predetermined number of messages have been made unavailable to the one or more consuming applications, comprises program code to determine that a predetermined number of consecutively consumed messages have been made unavailable to the one or more consuming applications.

22. The system of claim 16, wherein the program code to determine that the predetermined number of messages have been made unavailable to the one or more consuming applications, comprises program code to determine that a predetermined number of messages within a set of messages have been made unavailable to the consuming applications.

23. The system of claim 16, wherein the program code to make the message unavailable to the consuming applications, comprises program code to move each message to a side queue.

24. The system of claim 16, wherein the program code to make the message unavailable to the consuming applications, comprises program code to leave the message on the queue but making it invisible to the consuming applications.

25. The system of claim 24, wherein the queue manager further comprises program code to:

make invisible messages visible again to the consuming applications;

permit a previously prevented consuming application to consume messages;

permit a number of additional attempts by one or more of the consuming applications at processing previously invisible messages before moving the previously invisible messages to a side queue.

26. The system of claim 16, wherein the program code to prevent one or more of the consuming applications from consuming messages from the queue, comprises program code to stop the one or more consuming applications.

27. The system of claim 16, wherein the program code to prevent one or more of the consuming applications from consuming messages from the queue, comprises program code to block access by the one or more consuming applications to the queue.

28. The system of claim 16, wherein the program code to prevent one or more of the consuming applications from consuming messages from the queue, comprises program code to prevent those of the one or more consuming applications interested in consuming messages of a particular type.

29. The system of claim 16, wherein the program code to prevent one or more of the consuming applications from consuming messages from the queue, comprises program code to identify amongst the one or more consuming applications a consuming application responsible for messages being made unavailable and to prevent preventing the identified consuming application from consuming messages from the queue.

30. The system of claim 16, wherein the program code to prevent one or more of the consuming applications from consuming messages from the queue, comprises program code to disable the queue.

* * * * *